Oct. 15, 1940.                W. R. FINUCAN                2,218,259
                                 FISH LURE
                            Filed Dec. 18, 1937

INVENTOR.
WILLIAM R. FINUCAN
BY
                    ATTORNEYS

Patented Oct. 15, 1940

2,218,259

UNITED STATES PATENT OFFICE 2,218,259

FISH LURE

William R. Finucan, Cleveland, Ohio

Application December 18, 1937, Serial No. 180,598

5 Claims. (Cl. 43—42)

This invention relates to fish lures and more particularly to a fish lure constructed in a manner to impart a life-like side-to-side movement of the lure as the same is drawn through the water.

It is among the objects of my invention to provide a fish lure having surfaces diverging from each other which will function to carry the lure toward the surface of the water and at the same time cause the lure to follow a zig-zag path not unlike the path described by a live minnow swimming through the water. It is a further object of my invention to provide a fish lure in accordance with the preceding object which may be made of metal and in various sizes suited to fly or bait casting. It is a further object of my invention to provide a fish lure having the surfaces such as mentioned above polished so as to reflect light and flash through the water in a manner which will attract fish. It is a further object of my invention to provide an action blade or a carrier device for a lure which will impart the above mentioned life-like side-to-side movement to a conventional inanimate lure such as a feathered hook, bucktail or the like. It is a further object to provide an actuating blade or carrier device according to the preceding object with means easily and quickly manipulated to attach or detach such various inanimate lures as may be selectively desired by the fisherman. Further objects and advantages relating to simplicity of construction and economies of manufacture will appear from the following description and the appended drawing in which:

It is common practice among fisherman to combine various bait devices with feathered hooks so as to impart an eccentric motion to the feathered hook or attract the fish to the lure in its entirety by incorporating a brightly polished metallic blade which spins or flops through the water. A conventional type of head or action blade for a composite lure is that known in the art as a "spinner" which is merely a spoon shaped blade mounted to freely rotate and spin through the water immediately in advance of a feathered hook or other type of bait or lure.

The preferred form of my invention relates principally to an improved action blade or actuator device which may be used in a composite lure in place of the conventional spinner. An actuator device constructed according to my invention distinguishes in action or function from the convention spinner in that it causes the lure or bait attached thereto to follow a zig-zag path characterized by a rapid darting from one side to the other as the lure is drawn through the water and further distinguishes over the conventional spinner in that it is provided with surfaces which tend to raise the lure toward the surface of the water.

Figure 1:
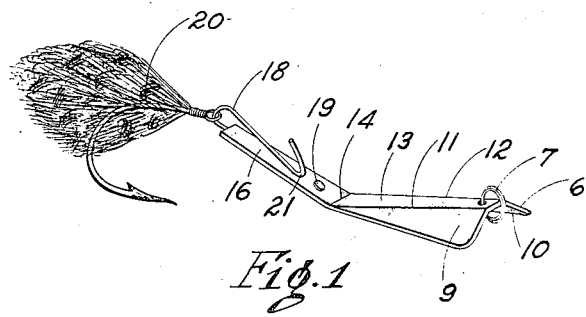
Figure 1 is a perspective view of a preferred form of my invention.
Figure 2:
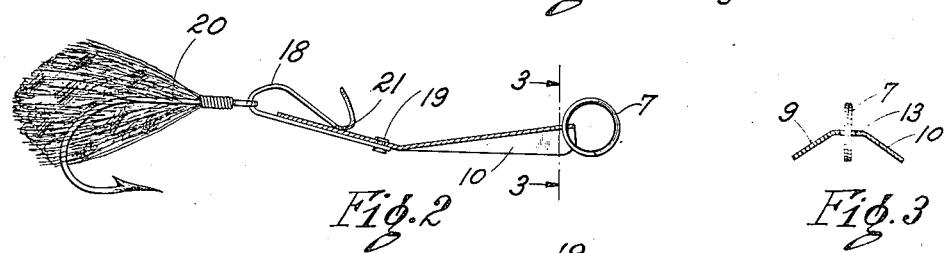
Figure 2 is a longitudinal sectional view of the fish lure shown in Figure 1.
Figure 3:
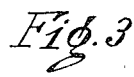
Figure 3 is a transverse sectional view taken along the line 3—3 of Figure 2.
Figure 1A:
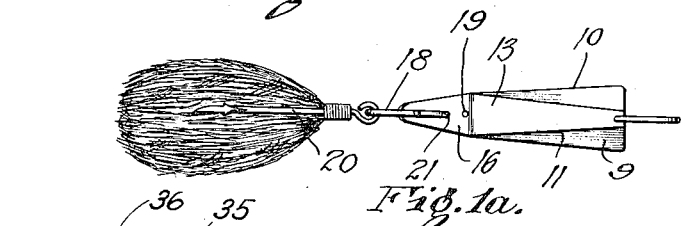
Figure 1a is a plan view of the lure of my invention.

Referring particularly to Figure 1 the body of the action blade or "head" device comprises a generally trapezoidal shaped strip of metal indicated in its entirety as at 6 in which the central portion of the forward end of the trapezoid presents the leading edge of the lure and is provided with a ring 7 adapted to receive the fish line or leader. Preferably the ring 7 or its equivalent fan or swivel structure is loosely mounted at the forward edge so that the lure may have a free movement with respect to the line which pulls the lure through the water. The opposed corner areas 9 and 10 of the leading edge are preferably folded downwardly along the fold lines 11 and 12 so as to provide a pair of diverging flat surfaces 9 and 10 joined to a common flat surface 13. The fold lines 11 and 12 preferably diverge from each other in a rearward direction so that the small trapezoidal surface 13 has its rearward end disposed in a fold line as at 14. The tail or end portion 16 of the actuator device is preferably bent at a slight angle with respect to the forward part of the device and carries a hook 18 secured as at 19 which is brought about the tail in a loop and pressed resiliently against the flat surface 16 as at 21. Any type of feathered hook 20 or baited hook which may be arbitrarily selected by the fisherman may be applied to the hook 18 by temporarily springing the loop portion 21 away from the tail plate 16.

In operation it appears that the surfaces 13 and 16 contribute substantially to the tendency of the bait to rise toward the surface of the water as it is being retrieved by the fisherman and that the surfaces 9 and 10 co-operate with the pull through the fish line on the ring 7 to occasion the side-to-side darting movement of the lure. Although it is extremely difficult to determine exactly what part each of the surfaces 9 to 16 play in bringing about the various movements of the device and I have found that the desired side-to-side movement of the lure may be obtained through relatively wide variations from the angles and proportions shown in the drawing. It is preferred, however, that the four surfaces 9, 10, 13 and 16 be retained and that the surfaces 9 and 10 be arranged to dip generally downwardly as shown with respect to the surface 13 and that the surface 13 be disposed at an angle with respect to the surface 16. The fold lines as at 11, 12 and 14 are preferably sharp as shown in the drawing.

It will be observed that in using the preferred embodiment of my invention above described, the fisherman may quickly and easily replace the bait or lure indicated generally as at 20 with any feathered hook or bait hook he may have in his tackle and that such hooks as he may apply to the action blade or lure actuating device 6 will be given a life-like side-to-side motion. The hook may be turned upwardly or downwardly with respect to the lure depending upon the fancy of the fisherman. It is not necessary to retrieve the action blade and its attached lure rapidly in order to achieve the motion I have described, but it is, of course, understood that the weight of the baited hook or the feathered hook 20 will effect the magnitude of the side-to-side action and will also effect the rate at which the lure in its entirety approaches the surface of the water.

For fly rod use I have found that an action blade or lure actuating device made according to my invention from about ½ to 1½ inches in length and with a width of about ⅓ of its length will operate satisfactorily. For bait casting a somewhat larger and heavier type of action blade should be employed, for instance, a blade of about 2 inches over-all length and weighing from ½ to ¾ oz.

Figure 4:
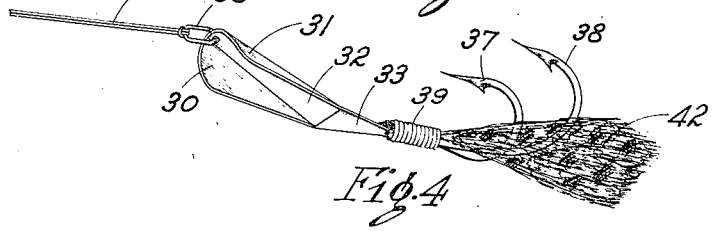
Figure 4 is a perspective view of another form of my invention.
Figure 5:
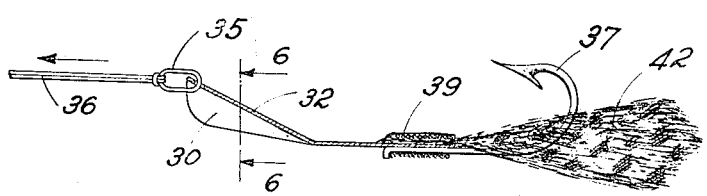
Figure 5 is a longitudinal sectional view of the species shown in Figure 4.
Figure 6:
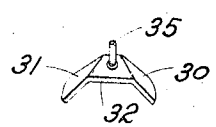
Figure 6 is a transverse sectional view taken along the lines 6—6 of Figure 5.

In Figures 4 to 6, inclusive, I have illustrated a complete or unitary fish lure constructed according to my invention having a body portion with the usual down turned ears 30 and 31 and the integral surfaces 32 and 33 corresponding substantially in shape and function to those described in connection with the preferred embodiment of Figure 1. The leading edge of the lure of Figure 4 is provided with a ring or fastener 35 adapted to receive the leader or line 36. The ring or fastener 35 employed with this species of my invention is loosely mounted as in the preferred embodiment so as to facilitate the free darting side-to-side movement of the lure. The tail portion of the lure as at 33 is provided with one or more feathered hooks such as 37 and 38 tied in the usual manner as at 39.

I have found in connection with the attaching of the feathered hooks to the tail portion of the lure that the hooks may be turned upwardly or downwardly with respect to the lure without destroying or adversely affecting the life-like side-to-side action of the lure. The feathering indicated as at 42 and the weight of the hooks 37 and 38 should be proportioned with respect to the area of the surfaces 30 to 33 inclusive to obtain the action desired. For instance, if the hooks 37 be extremely light or small with respect to the surfaces 30 to 33, the side-to-side movement will be more rapid and more violent than where heavier hooks are used to control or stabilize the side-to-side swing of the lure. I have found that surfaces and hooks proportioned substantially as shown may be used with success for most purposes and I appreciate that lighter hooks and the consequent more active lure may be desired by some fishermen.

From the foregoing description of my invention it will be understood that both the two-part lure of Figure 1 and the unitary lure of Figure 4 are characterized by a darting side-to-side movement of the lure as it is being retrieved through the water. In addition to the advantages above mentioned in connection with the description of the two different species I have found that a lure constructed according to my invention tends to right itself as soon as a retrieving movement of the lure is started. The tendency of the lure to maintain an upright position such as indicated in Figure 5 appears to result from a combination of various features such as the point and manner of attaching the leader or line to the lure, the balance of the parts and the proportion and disposition of the surfaces of the lure with respect to each other.

Although I have shown and described two forms of my invention in considerable detail, it will be appreciated that numerous colorable variations may be made therein by those skilled in the art without departing from the scope of the invention as defined in the following claims.

I claim:

1. A fish lure comprising a separable action blade and hook, said blade comprising integrally formed body and tail parts, said body part having a central surface arranged to lift the lure toward the surface of the water as the lure is pulled through the water and a pair of downwardly directed diverging surfaces cooperating with said central surface to carry the lure alternately from side-to-side as the lure is pulled through the water, said tail part being provided with a hook fastener comprising a wire having one end fixed to said tail part, the other end bent into position adjacent the surface of said tail part and a hook supporting loop intermediate said ends.

2. A fish lure comprising body and tail portions arranged at an angle with respect to each other, said body having a relatively wide leading edge portion and shaped to progressively decrease in width rearwardly therefrom, the opposed free ends of said leading edge portion being turned downwardly and outwardly with respect to the center of the body and said tail portion being inclined upwardly and rearwardly with respect to said body portion, said lure being adapted to be attached to a line at the center of the leading edge thereof and to be associated with a hook at the rearward end of the tail portion thereof.

3. A fish lure comprising a body having head and tail portions, said tail portion terminating in a vane, a fastener for bait or feathered hooks carried by said tail portion comprising a resilient wire extending along one side of said vane, about the end thereof to provide a loop and thence back towards the other side of said vane to resiliently close said loop.

4. A fish lure formed from relatively thin sheet material having a generally trapezoidal outline, the forward portion of such lure comprising a central flat portion trapezoidally shaped, said leading edge, and said forward portion also comprising symmetrically disposed substantially triangularly shaped wing portions having their bases inclined downwardly and outwardly from said forward portion of said central portion and having their inner sides joining said central portion and their outer sides lying in the outer sides of said lure, the apices of said wing portions terminating adjacent the forward end of said central flat portion, said lure also comprising a substantially flat trapezoidally shaped tail portion having its forward end adjoining the rearward end of said central forwardly extending portion and being inclined upwardly and rearwardly therefrom at an obtuse angle thereto, the side edges of said tail portion roughly corresponding to projections of the outer sides of said wing portions, said lure also comprising means for attaching a line to the central portion of the leading edge and for attaching a hook to the rearward part of the tail portion thereof.

5. An action blade comprising a body and tail portion of trapezoidal outline with the base disposed foremost said body portion having a generally flat surface extending centrally longitudinally thereof, and a pair of generally flat surfaces extending downwardly from each side of said centrally arranged surface, said tail portion integrally secured to said body portion, bent upwardly at an angle with respect thereto and adapted to be connected to a hook.

WILLIAM R. FINUCAN.